April 14, 1931. T. E. GENTRY 1,801,077

NAIL

Filed Jan. 18, 1929

Inventor
Tandy E. Gentry

By Murray Rugeter
Attorneys.

Patented Apr. 14, 1931

1,801,077

UNITED STATES PATENT OFFICE

TANDY E. GENTRY, OF CARTHAGE, MISSOURI, ASSIGNOR TO THE EAGLE-PICHER LEAD COMPANY, OF CINCINNATI, OHIO, A CORPORATION OF OHIO

NAIL

Application filed January 18, 1929. Serial No. 333,280.

This invention relates to a nail of the type that tightly closes and seals the hole in the material through which the nail is driven.

An object of the invention is to provide a nail of the above type, the head of which will effectively withstand hammer blows that ordinarily render unfit for use the present nails of this type.

These and other objects are attained by the means described herein and disclosed in the accompanying drawings, in which.

Figure 1:
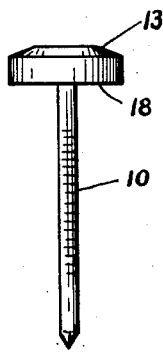
Fig. 1 is an elevational view of the nail of invention.
Figure 2:
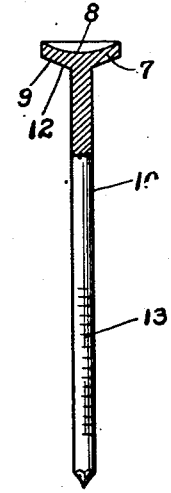
Fig. 2 is an enlarged view, partly in cross section, showing one constituent part of the nail shown in Fig. 1.

The composite nail of this invention comprises a headed nail, shown in Fig. 2, the head 7 of which is formed to present a dished or concave top surface 8. The under side 9 of the head is preferably, though not necessarily, tapered toward the shank 10 of the nail to present a conical or convex surface 12. The shank of the nail may be provided with the usual serrations 13 for increasing the holding power of the nail.

Figure 3:
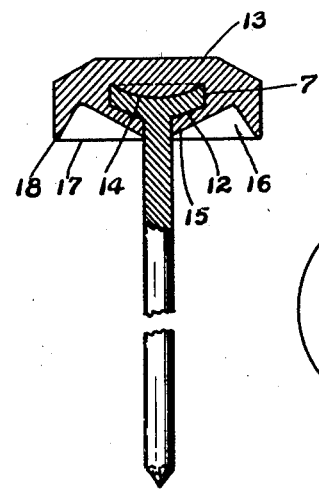
Fig. 3 is a vertical cross section of the nail shown in Fig. 1.
Figure 4:
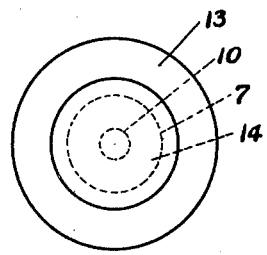
Fig. 4 is a top plan view of the nail shown in Figs. 1 and 3.

As shown in Fig. 3, the head 7 of nail 10 is embedded in a cap or large head 13, of comparatively soft metal such as lead or a soft alloy. The cap or large head 13 is preferably circular in shape and is provided interiorly thereof with a complementary bulge or protuberance 14, which is adapted to extend into or fill the depression formed by the upper concave surface 8 of the nail head. As shown in Fig. 4, the protuberance is disposed concentrically with the periphery of the circular cap 13.

The soft metal of the cap that covers the under side 9 of nail 10 is so formed about the shank thereof as to form a cone 15, the apex of which points in the general direction of the pointed end of the shank. By providing an annular depression 16 in the under side 17 of the cap, a sharp wedge-like circumferential sealing edge 18 is formed.

It is desired now to stress the function of the concavity in the nail head and the cooperative protuberance 14 on the soft metal cap 13. Heretofore, nails having soft metal heads or caps, were manufactured by covering with lead the ordinary flat or round headed nail such as is commonly used in present day carpenter work. Considerable trouble was encountered in the use of these nails, because of the tendency of the lead cap to spread under the force of hammer blows. Sometimes the lead cap would spread and the top thereof would become so thin that the nail head would break through, thereby greatly reducing the effectiveness of the cap as a seal for the hole made by the nail shank. This disadvantage has been greatly overcome by providing the nail with a concave head, the cavity of which is adapted to receive a corresponding protuberance formed within the soft metal cap. Hammer blows directed upon the cap of a nail so constructed do not readily flatten the cap, because each blow tends to force the soft metal toward the center of the cavity instead of toward the outer edge of the flat head heretofore used. As a result, the nail of this invention withstands additional and more severe hammer blows than the nails in common usage.

Figure 5:
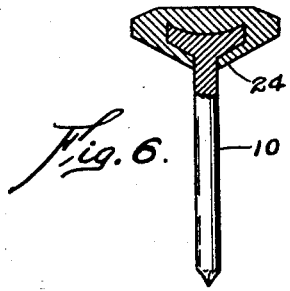
Fig. 5 is a view, partly in cross section, showing a use to which the nail of this invention may be put.

In Fig. 5 is shown a method of securing corrugated metal roofing 21 to an understructure 22. As the nail is driven to the home position, the soft metal annular edge 18 strikes the hard surface of the roofing material, thereby causing the edge 18 to yield and conform to the shape or contour of said surface. At the same time, the conical shaped portion 15 of the cap plugs the nail hole 23.

Figure 6:
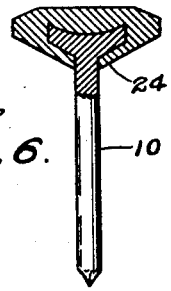
Fig. 6 is a view, partly in cross section, of a modified form of the nail.

The nail shown in Fig. 6 is substantially the same as that shown in Fig. 3, except that the cap does not provide the annular edge 18. The nail shown in Fig. 6, however, is provided with the head and cap of invention. A seal is effected by the conical portion 24 entering a nail hole such as 23.

By the use of nails fabricated in accordance with the teaching of the invention, the labor, time and money heretofore wasted in removing nails destroyed by the blows of the hammer, is saved. Furthermore, it is possible to acquire a tighter and more weather proof closure by the use of these nails.

What is claimed is:

1. As a new article of manufacture, a composite nail comprising a hard metal nail having a shank and a head, the top of the head having a concavity, and a comparatively soft metal cover cap for said head comprising an interior protuberance for filling the concavity in the head.

2. As a new article of manufacture, a composite nail comprising a hard metal nail having a shank and a head, the upper surface of said head having a concavity, a comparatively soft metal cover cap for said head comprising an interior protuberance for filling the concavity in the head, said cover cap being provided also with means for plugging a nail hole, and for effecting an annular seal about the plug means.

3. As a new article of manufacture, a composite nail comprising a headed nail of hard metal, the under surface of the head of which tapers toward the shank of the nail in the general direction of the pointed end of the nail, and a comparatively soft metal cap entirely covering the head and providing a substantially uniform thickness of soft metal upon the said tapered under surface of the nail head.

4. As a new article of manufacture, a composite nail comprising a headed nail of hard metal, the under surface of the head of which tapers toward the shank of the nail in the general direction of the pointed end of the nail, the top surface of the head having a concavity therein, and a comparatively soft metal cap covering the head and filling the concavity and conforming with said tapered under surface of the nail head.

In testimony whereof, I have hereunto subscribed my name this 17th day of January, 1929.

TANDY E. GENTRY.